(12) United States Patent
Hamer

(10) Patent No.: US 11,604,078 B2
(45) Date of Patent: Mar. 14, 2023

(54) METHOD AND DEVICE FOR GENERATING DIGITAL MAP MODELS

(71) Applicant: Continental Automotive GmbH, Hannover (DE)

(72) Inventor: Henning Hamer, Munich (DE)

(73) Assignee: Continental Automotive GmbH, Hannover (DE)

( * ) Notice: Subject to any disclaimer, the term of this patent is extended or adjusted under 35 U.S.C. 154(b) by 349 days.

(21) Appl. No.: 16/623,952

(22) PCT Filed: Jun. 20, 2018

(86) PCT No.: PCT/EP2018/066400
§ 371 (c)(1),
(2) Date: Dec. 18, 2019

(87) PCT Pub. No.: WO2019/002043
PCT Pub. Date: Jan. 3, 2019

(65) Prior Publication Data
US 2020/0141740 A1 May 7, 2020

(30) Foreign Application Priority Data

Jun. 27, 2017 (DE) ...................... 10 2017 210 798.7

(51) Int. Cl.
*G01C 21/00* (2006.01)
*G06T 17/05* (2011.01)
*G06V 20/56* (2022.01)

(52) U.S. Cl.
CPC ...... *G01C 21/3841* (2020.08); *G01C 21/3811* (2020.08); *G06T 17/05* (2013.01); *G06V 20/56* (2022.01)

(58) Field of Classification Search
CPC ...... G01C 21/00; G01C 21/005; G01C 21/26; G01C 21/28; G01C 21/30; G01C 21/32;
(Continued)

(56) References Cited

U.S. PATENT DOCUMENTS

2016/0012633 A1 1/2016 Wei et al.
2020/0141740 A1 5/2020 Hamer

FOREIGN PATENT DOCUMENTS

CN 103413352 A * 11/2013
DE 102015006073 A1 2/2016
(Continued)

OTHER PUBLICATIONS

"Simultaneous Localization and Mapping" https://de.wikipedia.org/wiki/Simultaneous_Localization_and_Mapping; 2016.
(Continued)

*Primary Examiner* — Charles J Han

(57) ABSTRACT

The invention relates to a method for generating and/or updating a digital model of at least one sub-region of a digital map, said digital model being assembled from sections originating from different sources. First data are provided relating to a first section and comprising objects and/or feature points characterized at least by their spatial position, said objects and/or feature points being classifiable into a plurality of degrees of detail. Second data are then provided, relating to a second section and comprising objects and/or feature points characterized at least by their spatial position, said objects and/or feature points being classifiable into the plurality of degrees of detail. The first section and the second sections partially overlap. The method, which is preferably implemented in a backend, includes aligning the first section and the second section relative to each other by minimizing a target functional, which has a weighted error term for each degree of detail of the plurality of degrees of detail, in one or more processors, wherein each error term describes a weighted deviation between the objects and/or feature points of the first section and the corresponding objects and/or feature points of the second section.

10 Claims, 2 Drawing Sheets

(58) Field of Classification Search
CPC .. G06K 9/00; G06K 9/00624; G06K 9/00791; G06T 17/00
See application file for complete search history.

(56) References Cited

FOREIGN PATENT DOCUMENTS

| | | |
|---|---|---|
| DE | 102014015073 A1 | 4/2016 |
| EP | 2372310 B1 | 3/2015 |
| WO | 2019002043 A1 | 1/2019 |

OTHER PUBLICATIONS

Iterative closest point; https://en.wikipedia.org/wiki/Iterative_closest_point.

Office Action dated May 18, 2018 from corresponding German Patent Application No. DE 10 2017 210 798.7.

International Search Report and Written Opinion dated Sep. 3, 2018 from corresponding International Patent Application No. PCT/EP2018/066400.

* cited by examiner

METHOD AND DEVICE FOR GENERATING DIGITAL MAP MODELS

BACKGROUND

The invention relates to the generation of digital map models from data collected from vehicles. The invention relates in particular to the generation of digital road models from data collected from vehicles.

Digital maps and road models are required for many intended purposes in the field of mobility, for example for navigation systems, driver assistance systems, autonomously driving vehicles. For driver assistance systems and autonomously driving vehicles in particular, a generally high degree of accuracy and the largest possible number of distinctive features on or along the road are necessary in the digital map in order to enable position determination which is more accurate than known positioning methods such as satellite navigation or dead reckoning methods.

In order to capture and update the data on which the road models are based, providers of digital road models drive special vehicles equipped with a number of different sensors on the roads. Since the number of vehicles used for these purposes is small, updating of the road data may require a relatively long time. In addition, the position data relating to the vehicles are often inaccurate on account of the inaccuracy of the positioning sensors, thus resulting overall in an inaccurate digital road model.

On the other hand, it is possible to create digital road models in a backend from a plurality of sections, where each section represents a digital sub-model. Such a digital sub-model can be generated by a vehicle from camera images, which the vehicle records while driving along the road. Such a digital sub-model is uploaded from the vehicle to the backend. The generation of the digital road model in the backend requires an assembly of sections or sub-models that have been generated by a plurality of vehicles, in regions where these overlap.

BRIEF SUMMARY

It is therefore the object of the invention to specify a method, a device and a system for generating digital map models that are reliable and work safely.

This object is achieved by a method according to the independent method claim, a device according to the independent device claim, and a system according to the independent system claim. The dependent claims relate to particular embodiments.

The invention relates to a method for generating and/or updating a digital model of at least one sub-region of a digital map, said digital model being assembled from sections originating from different sources. First data are provided relating to a first section and comprising objects and/or feature points characterized at least by their spatial position, said objects and/or feature points being classifiable into a plurality of degrees of detail. Second data are then provided, relating to a second section and comprising objects and/or feature points characterized at least by their spatial position, said objects and/or feature points being classifiable into the plurality of degrees of detail. The first section and the second sections partially overlap. The first section relates to a digital sub-model and may have been generated in a vehicle from a plurality of camera images that were recorded by the vehicle when driving along a road. The second section relates to a digital sub-model and may have been generated by a different or the same vehicle from a plurality of camera images that were recorded by another or the same vehicle when driving along a road. The objects of the sections of the digital model relate in particular to objects such as road signs, road markings, traffic lights. The feature points relate, for example, to prominent landmarks. Correspondences are determined between objects and/or feature points of the first section and the second section. Corresponding objects and/or feature points are therefore present in both sections.

The degrees of detail of the objects or feature points relate to a classification of these into different levels of resolution of the digital model. A degree of detail can be assigned in particular to an object class. For example, a first (lower) degree of detail can comprise the objects of the road fittings, in particular, road signs and street lights. A second (medium) degree of detail can comprise road features, in particular lines of road markings. A third (high) degree of detail can comprise 2D/3D feature points, which can be described by virtue of their position and a visual descriptor.

The method, which is preferably implemented in a backend, includes aligning the first section and the second section relative to each other by minimizing a target functional, which has a weighted error term for each degree of detail of the plurality of degrees of detail, in one or more processors, wherein each error term describes a weighted deviation between the objects and/or feature points of the first section and the corresponding objects and/or feature points of the second section. This means that for each degree of detail the target functional has a separate weighted error term, which describes the deviation between the corresponding features for precisely this degree of detail. The alignment can be based on at least rotation and translation of the sections relative to each other.

As part of the minimization process, local gradient-based optimization methods can be applied. This is problematic in the case of a multimodal optimization problem, i.e., if the target functional has multiple local minima, because depending on the initial resolution, a local gradient-based procedure can become trapped in a local minimum, which means that the global minimum is no longer reached. The global minimum corresponds to the optimal alignment of the sections to each other.

The fact that the target functional contains a separate weighted error term for each degree of detail means it is possible, by an appropriate control of the weights of the error terms in the course of the optimization process, to keep the current solution, i.e. the alignment of the sections relative to each other, always within the catchment range of the global minimum. For example, the weights can be dynamically controlled in such a way that a coarse alignment of the sections relative to each other is carried out first, by minimizing the error terms of the lowest degree of detail. In the further course of the optimization the error terms of the medium and high degree of detail can be incorporated by appropriate control of their weights. The weights of the error terms of the target functional may therefore be variable.

In the course of the minimization of the target functional, the weight of error term of the first (lowest) degree of detail can be reduced and the weight of the error term of the third (highest) degree of detail can be increased. The weight of the error terms of the medium degree of detail can remain constant. At the beginning of the optimization process all weights may be non-zero. A simultaneous optimization of all degrees of detail therefore takes place.

The procedure can also be carried out completely iteratively, i.e., if for the error term of a certain degree of detail no further significant improvement of the target functional is obtained, then in the subsequent minimization the error term associated with this degree of detail is ignored and the error term of the next higher degree of detail is considered instead. This is also carried out by a corresponding control of the weights. It can thus be provided that firstly, the weight of the error term of the first degree of detail is non-zero and the weights of the error terms of the second and third degree of detail are equal to zero and the minimization of the target functional is carried out until the deviation between the first objects and/or feature points and the second objects and/or feature points falls below a threshold value, or else a first minimum number of iteration steps has been exceeded. It can be further provided that the weight of the error term of the second degree of detail is then non-zero and the weights of the first and third degree of detail are equal to zero and the minimization of the target functional is carried out until the deviation between the first objects and/or feature points and the second objects and/or feature points falls below a threshold value, or else a second minimum number of iteration steps has been exceeded. It can be additionally provided that then the weight of the error term of the third degree of detail is non-zero and the weights of the error terms of the first and second degree of detail are equal to zero and the minimization of the target functional is carried out until the deviation between the first objects and/or feature points and the second objects and/or feature points falls below a threshold value, or else a third minimum number of iteration steps has been exceeded.

It is also possible to consider temporal aspects in the minimization, i.e. the times at which the individual sections were generated. In particular, the feature points of the highest degree of detail can change over time. Thus a tree looks different in summer than in winter, which results in different feature points. If the time interval between two sections to be aligned is small, then the feature points of the highest degree of detail are weighted higher. If the time interval between two sections to be aligned is large, then the objects and/or feature points of lower degrees of detail are weighted higher. It can therefore be provided that a time difference is firstly determined between a first time at which the first section was created and a second time at which the second section was created. The weight of the error term of the first degree of detail is lower than the weight of the error term of the third degree of detail if the time difference is less than a first time threshold value. The weight of the error term of the first degree of detail is higher than the weight of the error term of the third degree of detail if the time difference is greater than a second time threshold value.

On the other hand, can similar times also be considered, which can be temporally arbitrarily far apart. Thus, similar times, such as the same time of day or same season, result in the highly detailed objects and/or feature points being more similar than other times that are only slightly apart, such as daytime and night-time. Therefore it may be provided that the highly detailed objects and/or feature points, hence the error term of the highest degree of detail are weighted higher than the less detailed objects and/or feature points, hence the error term of lower degrees of detail.

One aspect concerns the optimization controlled alignment of the sections relative to each other. The alignment of the sections can take place depending on the level of detail. This is particularly relevant if the weights change during the optimization process, for example, if this is carried out iteratively as described above. If initially only the error term of the lowest degree of detail is minimized, then the alignment is carried out only by translation and rotation. If subsequently the error term of the medium degree of detail is minimized, then the alignment is carried out only by translation and rotation. If, on the other hand, the error term of the highest degree of detail is subsequently minimized, then the alignment is carried out by translation and rotation, and additionally by elongation and compression of the sections, wherein the elongation or compression of the sections is carried out in a linear manner over an entire section. It is also possible to take into account elongation and compression even in the error term of the lowest and/or medium degrees of detail.

The alignment by translation and rotation can be carried out by a SLAM (Simultaneous Localization and Mapping) procedure, such as, for example, Extended Kalman Filter (EKF) SLAM, Sparse Extended Information Filter (SEIF) SLAM and Unscented Kalman filter (UKF) SLAM. The distance between different feature points in a section remains the same.

In addition, the alignment by elongation or compression of a section can be performed with a non-rigid Iterative Closest Point (ICP) procedure. It is also possible to "warp" different objects/features onto each other, wherein an arbitrary vector field of the first section is mapped onto an arbitrary vector field of the second section. The ICP procedure delivers the correspondences with respect to the objects and/or features from the first and second section. These correspondences define the vector field.

Another aspect relates to a backend device. This has a memory which is configured for providing first data relating to a first section and comprising objects and/or feature points characterized at least by their spatial position, said objects and/or feature points being classifiable into a plurality of degrees of detail, and providing second data relating to a second section and comprising objects and/or feature points characterized at least by their spatial position, said objects and/or feature points being classifiable into the plurality of degrees of detail. The first section and the second section at least partially overlap. The backend device additionally has one or more processors which are configured for generating and/or updating a digital model of at least one sub-region of a digital map, said digital model being assembled from sections originating from different sources, by aligning the first section and the second section relative to each other by minimizing a target functional, which has a weighted error term for each degree of detail of the plurality of degrees of detail, each error term describing a weighted deviation between the objects and/or feature points of the first section and the corresponding objects and/or feature points of the second section.

A further aspect relates to a method for generating and/or updating a digital model of at least one sub-region of a digital map, said digital model being assembled from sections. The system has a plurality of vehicles, which are configured for generating data relating to a section and comprising features characterized at least by their spatial position, said features being classifiable into a plurality of degrees of detail, from a plurality of recorded images and for transferring said data to a backend device. In addition, the system comprises a backend device. The backend device has a receiving device which is configured for receiving first data relating to a first section and comprising objects and/or feature points characterized at least by their spatial position, said objects and/or feature points being classifiable into a plurality of degrees of detail; and for receiving second data relating to a second section and comprising features characterized at least by their spatial position, said features being classifiable into plurality of degrees of detail. The first section and the second section at least partially overlap. The backend device additionally has one or more processors which are configured for generating and/or updating a digital model of at least one sub-region of a digital map, said digital model being assembled from sections originating from the plurality of vehicles, by aligning the first section and the second section relative to each other by minimizing a target functional, which has a weighted error term for each degree of detail of the plurality of degrees of detail, each error term describing a weighted deviation between the objects and/or feature points of the first section and the corresponding objects and/or feature points of the second section.

BRIEF DESCRIPTION OF THE DRAWINGS

The invention will be described below on the basis of example embodiments and with reference to figures, in which.

DETAILED DESCRIPTION

Figure 1:
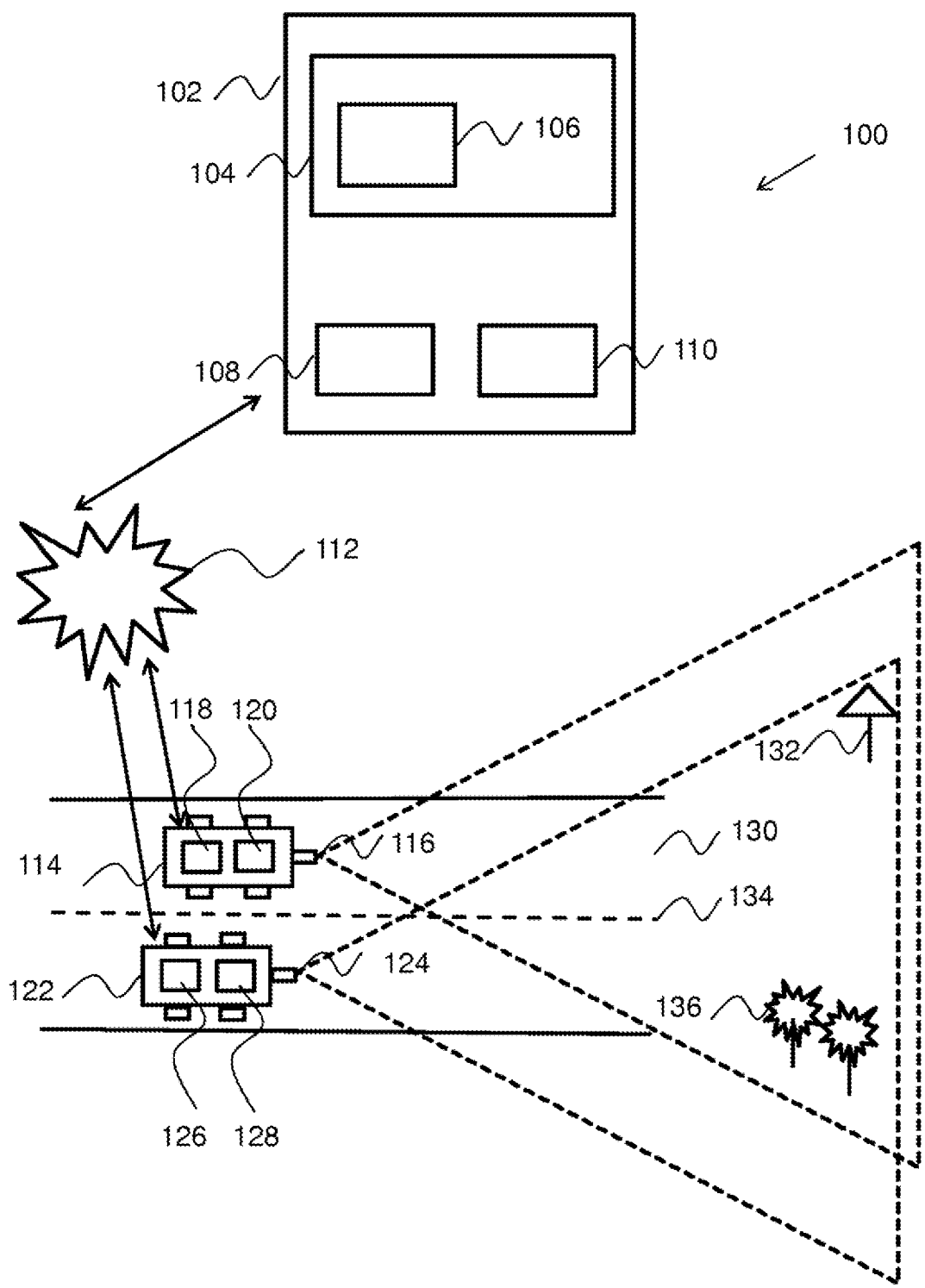
FIG. 1 shows a block circuit diagram of a system.

FIG. 1 shows a block diagram of a system 100 for generating and/or updating a digital model of at least one sub-region of a digital map, said digital model being assembled from sections. The system includes a backend device 102, a network 112 and two vehicles 114, 122. The vehicles 114, 122 drive along a road 130 with two driving lanes that are separated by the dashed lane marking 134. The first vehicle 116 has a camera 116 for recording images of environment in the direction of travel, represented by the dashed cone. The first vehicle has a first processor 120, in which from environment images a first 2D/3D sub-model of the environment is computed. This 2D/3D model represents an approximately 100×100 m large section of a digital overall model of the environment, or a digital map. In the camera's field of view, environment points such as a road sign 132, the lines of the road marking 135, and a group of trees, which, which are represented in the 2D/3D sub-model as feature points of the environment. The group of trees is modeled by a visual descriptor. The environment points can be classified into different degrees of detail of the digital model. The road sign 132 is an object of the lowest degree of detail, the road marking 134 is an object of the medium degree of detail and the group of trees with their characteristic tree crown silhouette is an object of the highest degree of detail. The first vehicle 118 has a transmission/reception device 118 for transmitting the first 2D/3D sub-model via the network 112 to a transmission/reception device 108 in the backend 102. In the same manner as the first vehicle 114 the second vehicle 122 also has a camera 124 for recording images of the environment. The second vehicle 122 has a second processor 128, in which a second 2D/3D sub-model of the environment is computed from the environment images. The second vehicle 118 has a transmission/reception device 122 for transmitting the second 2D/3D sub-model via the network 112 to the transmission/reception device 108 in the backend 102.

In the backend 102, the first and the second 2D/3D sub-model, i.e., the first and second section of the composite digital model are stored in the memory 104. The memory 104 contains a software module with instructions, which when they are executed by the processor 110, implement a method for generating and/or updating a composite digital model of at least a sub-region of a digital map, said model being assembled from sections originating from the vehicles.

Figure 2:
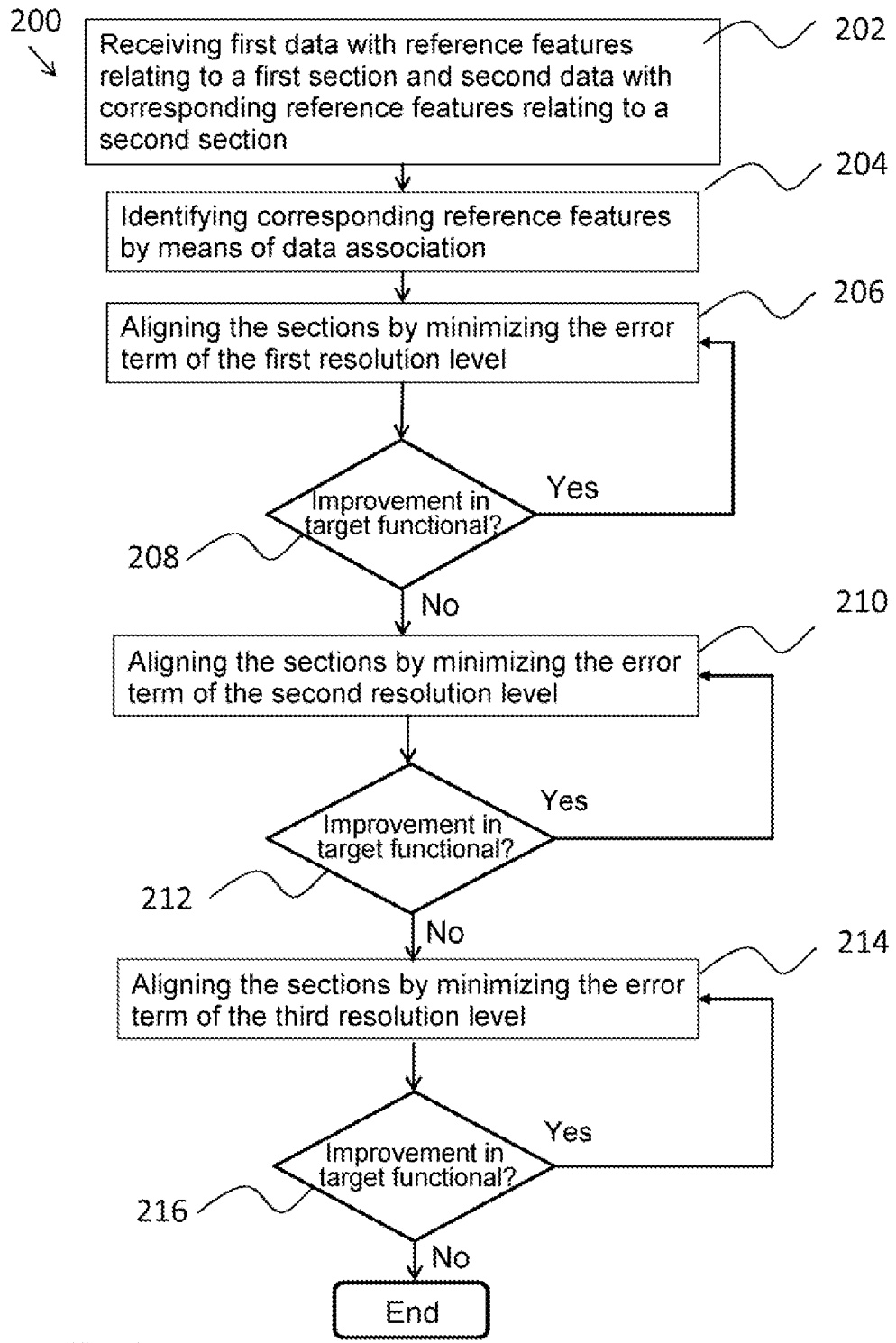
FIG. 2 shows a flow diagram of the method.

One embodiment of the method is described in conjunction with FIG. 2. In a first step 202, the first data relating to the first section with reference features, in particular the traffic sign 132, the lines of the road marking 134 and the visual descriptor for the group of trees 136, are received and provided in the memory 104. In addition, in the first step 202, the data relating to the second section with the corresponding reference features, in particular the traffic sign 132, the lines of the road marking 134 and the visual descriptor for the group of trees 136, are received and provided in the memory 104. In a second step 204, correspondences relating to the features of the first and second section are identified with a suitable data association procedure. If corresponding features are found, the first and second section are aligned relative to each other by minimizing a target functional, which describes the difference between the corresponding features for each degree of detail. The minimization here is designed iteratively, hence for each degree of detail a corresponding error term (deviation term) is minimized individually and successively, starting with the first (lowest) resolution level in step 206. The error term contains only the deviation between the traffic sign 132 in the first section and the traffic sign 132 in the second section. In step 208, a check is made to determine whether a further improvement of the target functional is produced, e.g. by comparing the value of the target functional of the current iteration step with the value of the target functional of the preceding iteration step. If this is the case, the error term for the first degree of detail is further minimized by aligning the sections relative to each other. If this is not the case, then the minimization of the target functional in step 210 is continued with the minimization of the error terms of the second (medium) degree of detail. The error term contains only the difference between the lines of the road marking 134 of the first section and the lines of the road marking 134 of the second section. In step 212, a check is made to determine whether a further improvement of the target functional is produced, e.g. by comparing the value of the target functional of the current iteration step with the value of the target functional of the preceding iteration step. If this is the case, the error term for the second degree of detail is further minimized by aligning the sections relative to each other. If this is not the case, then the minimization of the target functional in step 216 is continued with the minimization of the error terms of the third (highest) degree of detail. The error term contains only the difference between the visual descriptors for the group of trees 136 of the first section and the visual descriptors for the group of trees 136 of the second section. In step 216, a check is made to determine whether a further improvement of the target functional is produced, e.g. by comparing the value of the target functional of the current iteration step with the value of the target functional of the preceding iteration step. If this is the case, the error term for the third degree of detail is further minimized by aligning the sections relative to each other. If this is not the case, the method terminates. The alignment by minimizing the error terms of the first and second degree of detail is carried out by translation and rotation of the sections. The alignment by minimizing the error terms of the third degree of detail is additionally carried out by elongation and compression of the sections.

Features of the highest degree of detail generally occur relatively frequently, so that many correspondences can be found. The alignment on the basis of the features of the second degree of detail can be carried out reliably, as the dashed lines of the road markings are often clearly visible. The alignment on the basis of the features of the lowest degree of detail has the advantage that they can be represented as vertices in a 3D mesh. Such a mesh can always be triangulated, e.g. by means of Deleauny triangulation. The sections can be aligned relative to each other by means of ICP during a 3D reconstruction.

By the iterative minimization in different degrees of detail the global minimum of the deviation between the corresponding features of the first and second section is reached.

The invention claimed is:

1. A method, performed in a backend device, said method comprising:
   generating and/or updating a digital model of at least one region of a digital map, said digital model being assembled from digital sub-models collected by a plurality of vehicles, by:
      receiving a first digital sub-model regarding a first geographic area comprising a first plurality of objects and/or feature points, wherein said first plurality of objects and/or feature points are characterized, in the first digital sub-model, at least by their spatial position, and wherein said first plurality of objects and/or feature points are classifiable, in the first digital sub-model, into a plurality of degrees of detail, wherein the first digital sub-model is:
         generated by a first vehicle from camera images, which the first vehicle records while driving along a road, and
         uploaded to the backend device by the first vehicle;
      receiving a second digital sub-model regarding a second geographic area comprising a second plurality of objects and/or feature points, wherein said second plurality of objects and/or feature points are characterized, in the second digital sub-model, at least by their spatial position, and wherein said second plurality of objects and/or feature points are classifiable, in the second digital sub-model, into the plurality of degrees of detail, wherein the second digital sub-model is:
         generated by a second vehicle from camera images, which the second vehicle records while driving along a road, and
         uploaded to the backend device by the second vehicle;
      wherein the first digital sub-model and the second digital sub-model at least partly overlap; and
   aligning the first digital sub-model and the second digital sub-model relative to each other by minimizing an objective image-processing function, which has a weighted error term for each degree of detail of the plurality of degrees of detail, wherein each error term describes a weighted deviation between the objects and/or feature points of the first ccetion digital sub-model and the corresponding objects and/or feature points of the second digital sub-model.

2. The method as claimed in claim 1, wherein objects and/or feature points of a first degree of detail of the plurality of degrees of detail of the first and second plurality of objects and/or feature points comprise road fittings in the form of road signs and street lights.

3. The method as claimed in claim 2, wherein objects and/or feature points of a second degree of detail of the plurality of degrees of detail of the first and second plurality of objects and/or feature points comprise lines of road markings.

4. The method as claimed in claim 3, wherein feature points of a third degree of detail of the plurality of levels of detail of the first and second plurality of objects and/or feature points comprise 2D/3D feature points that are described by virtue of their position and a visual descriptor.

5. The method as claimed in claim 1, wherein the weighted error terms of the objective image-processing function each have a respective weight that is variable throughout minimization of the objective image-processing function.

6. The method as claimed in claim 5, wherein, throughout minimization of the objective image-processing function, a weight of the weighted error term of a first degree of detail is reduced, and a weight of the weighted error term of a third degree of detail is increased.

7. The method as claimed in claim 5, further comprising:
   firstly, setting a weight of a weighted error term of a first degree of detail to a non-zero value;
      setting a weight of a weighted error term of a second degree of detail and a weight of a weighted error term of a third degree of detail to zero; and
      carrying out the minimization of an objective image-processing function until either:
         a deviation between the first plurality of objects and/or feature points and the second plurality of objects and/or feature points falls below a threshold value, or
         a first minimum number of iteration steps has been exceeded;
   then, setting the weight of the weighted error term of the second degree of detail is to a non-zero value, and setting the weight of the weighted error term of the first degree of detail to zero and setting the weight of the weighted error term of the third degree of detail to zero, and carrying out the minimization of the objective image-processing function until either:
      the deviation between the first objects and/or feature points and the second objects and/or feature points falls below a threshold value, or
      a second minimum number of iteration steps has been exceeded; and
   then, setting the weight of the weighted error term of the third degree of detail to a non-zero value;
      setting the weight of the error term of the first degree of detail to zero;
      setting the weight of the error term of the second degree of detail to zero; and
      carrying out the minimization of the objective image-processing function until either:
         the deviation between the first objects and/or feature points and the second objects and/or feature points falls below a threshold value, or
         a third minimum number of iteration steps has been exceeded.

8. The method as claimed in claim 5, also comprising:
   determining a time difference between a first time point, at which the first digital sub-model was created, and a second time point at which the second digital sub-model was created; and
   wherein at least one of:
      if the time difference is less than a first time threshold, setting a weight of the weighted error term of the first degree of detail to a lower value than a value of a weight of the weighted error term of the third degree of detail; and
      if the time difference is greater than a second time threshold, setting the weight of the weighted error term of the first degree of detail to a higher value than the value of the weight of the weighted error term of the third degree of detail.

9. The method as claimed in claim 1, wherein the alignment of the first digital sub-model and the second digital sub-model, based on at least one of a first degree of detail and a second degree of detail, is carried out by translation and rotation.

10. The method as claimed in claim 9, wherein the alignment of the first digital sub-model and the second digital sub-model, based on at least a third degree of detail, is carried out by translation, rotation, elongation, compression, and warping, wherein at least one of the elongation and compression are carried out linearly over an entire digital sub-model.

* * * * *